H. H. DIKEMAN.
Wagon-Top.
No. 26,547. Patented Dec. 20, 1859.
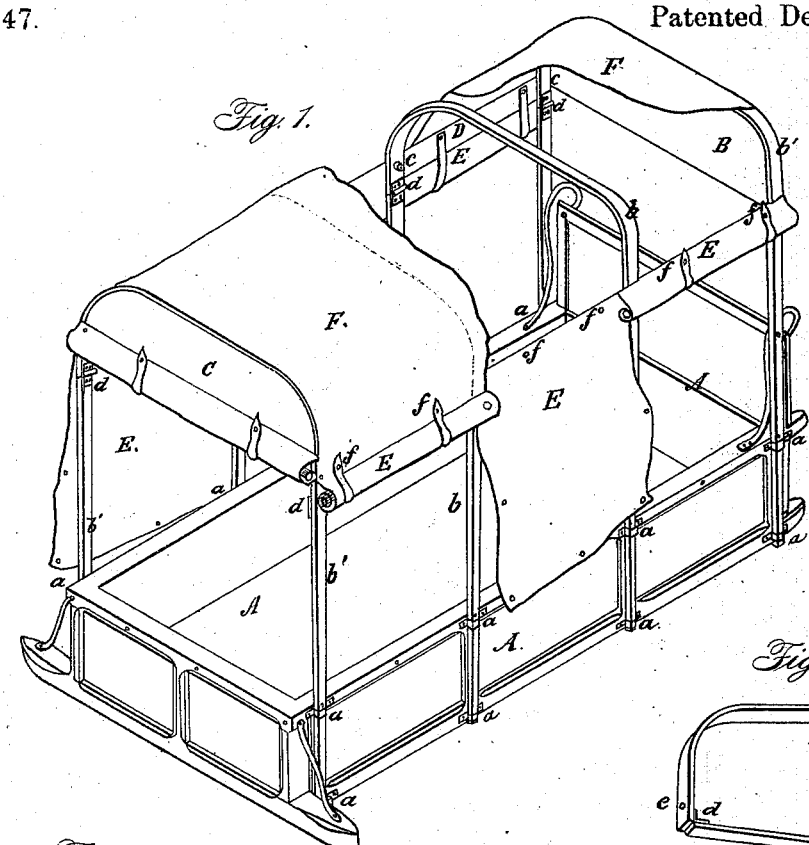
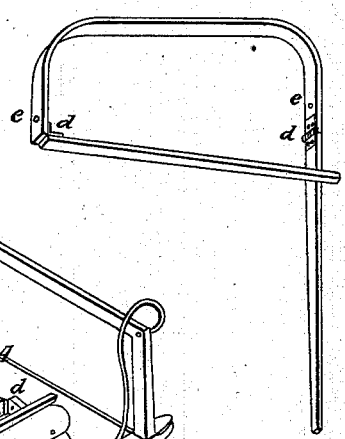
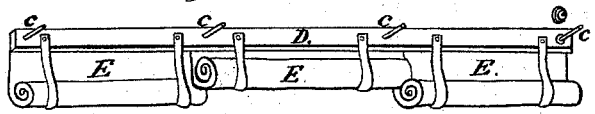
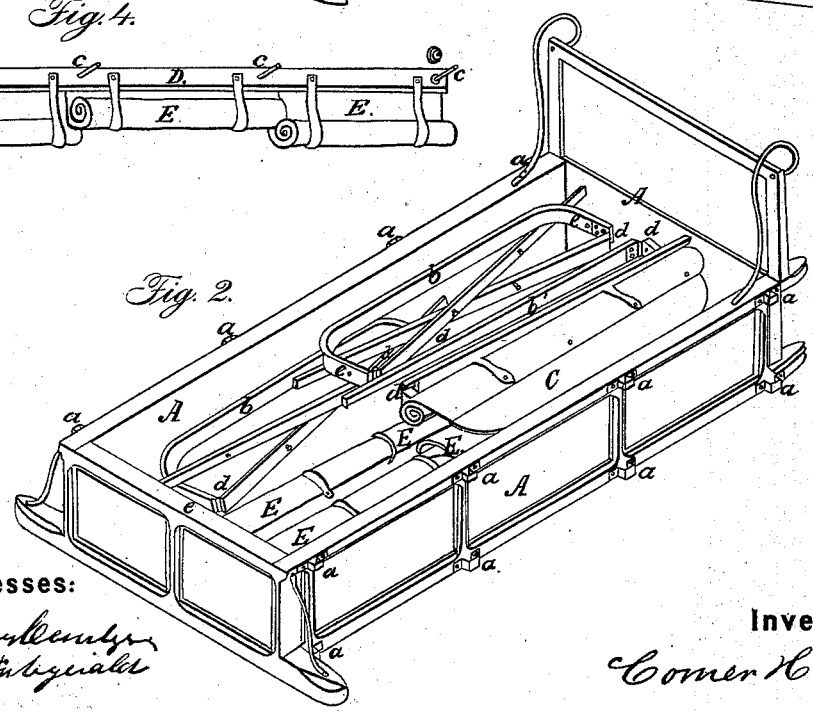
Witnesses:
Inventor: Comer H Dikeman

UNITED STATES PATENT OFFICE.

HOMER H. DIKEMAN, OF NEW HAVEN, CONNECTICUT, ASSIGNOR TO IRA DIKEMAN & SON, OF SAME PLACE.

SHIFTING TOP FOR WAGONS.

Specification of Letters Patent No. 26,547, dated December 20, 1859.

*To all whom it may concern:*

Be it known that I, HOMER H. DIKEMAN, of the city and county of New Haven and State of Connecticut, have invented a new and useful Improvement in Shifting Tops for Market-Wagons, &c.; and I do hereby declare that the following is a full, clear, and exact description of the construction, character and operation of the same, reference being had to the accompanying drawings, which make part of this specification, in which—

Figure 1, is a perspective view of the box of a wagon with the top on, but with a part of the cover cut away to show the jointed bows, railing, &c. Fig. 2, is a perspective view of the box, with the top packed in it ready to be fitted for transportation. Fig. 3, is a perspective view of one of the jointed bows, partially folded. Fig. 4, is a perspective view of the inner side of one of the side, or curtain, rails.

My improvement consists in making the bows to sustain the cover of the common market wagon, (or other wagon analogous to it,) with hinge, or knee, joints;—and in attaching the side, or curtain, rails to the bows in such a manner, by screw-bolts and nuts, that the top can be readily removed, (by taking it apart,) and attached to another wagon, or stored away when not needed;—or packed in the box, for transportation, in such a manner as to cost no more for freight than an ordinary wagon without a top.

I make the box, A, &c. in the usual form, or otherwise, with staple, or clasp, *a, a,* &c. to receive the lower ends of the bows, as usual.

I make the bows, *b,* and *b,* and *b′,* and *b′,* in the usual way, except that I make a hinge, or knee, joint in each leg of each bow, as shown at *d, d,* &c. in Figs. 1, 2, and 3, to enable me to fold up the bows for packing, as represented, in Fig. 2, and, that I make holes through them, on both sides, as shown at *e,* and *e,* Figs. 2, and 3, to receive the screw-bolts, *c, c,* &c. attach to the side, or curtain, rails, D.

To the front, and rear, bows, *b′,* and *b′,* I attach broad end rails, as represented at, B, and C, Fig. 1, (and indicated at C, Fig. 2,) to which, and the front, and rear, bows, I secure the ends of the top-cover, F, as indicated at B, and C, Fig. 1.

I make the side, or curtain, rails, substantially, as represented at D, Figs. 4, and 1. To these rails I firmly secure, (in any convenient way,) screw-bolts, as represented at *c, c,* &c. Fig. 4, to be passed through the holes, *e,* and *e,* in each of the bows. And, I fit them with knobs, or buttons, as shown at *f, f,* &c. Fig. 1. And, I attach to them the side curtains, C, C, and E, Figs. 1, and 4.

When I desire to use the top, I place all the bows, except the front and rear, in the staples, *a, a,* &c. I then insert the front, and rear, bows, *b′,* and *b′,* with the top-cover, F, attached as before stated, carrying the top-cover over the other bows. The hinge, or knee, joints are made rigid by spreading the lower ends, or legs, of the bows to conform to the staples. I then connect the side rails, D, (with the side curtains, C, &c. attached, as shown in Figs. 1 and 4,) by passing the screw-bolts, *c,* &c. through the holes *e,* and *e,* in the bows, *b* and *b,* and *b′,* and *b′,* and turning on nuts, as at *c,* and *c,* Fig. 1, (nuts to be worked by hand would be preferable.) I then button the side edges of the top-cover, F, to the knobs, or buttons, as shown at *f, f,* &c. when the whole will be ready for use, as a covered wagon, as indicated in Fig. 1.

To remove the top, I unbutton the edges of the top-cover,—turn off the nuts, and remove the side rails, (with the curtains,)—and then lift out the front, and rear, bows, and remove them with the top-cover, and then take out the other bows, when the wagon will be ready to use without a top.

When I desire to pack the wagon for transportation, I place all the parts of the top in the box, as represented in Fig. 2, and secure them there with cross boards, or otherwise.

If I do not design to pack the parts of the top in the wagon box for transportation, I omit the joints in the legs of the bows, but attach the rails, D, &c. in the manner before described. And if all the bows should be attached to the top-cover, when the side rails, D, are removed the cover and bows can be packed in the same space as the bows without the cover, whether the bows be made with or without joints.

The advantages of my improvement consist in the ease with which the top can be attached to or removed from, the wagon,—as the parts, when separate, are so light, that they can be handled, easily, by any person, and the most of the labor is to turn off some eight nuts from the screw-bolts; (whether the legs of the bows have joints or not,)—and, in that, the top, (when the joints are used,) can be packed in the box of the wagon, and thereby save at least one half of the expense of transportation,—and, in that, this kind of shifting top is applicable to a great variety of uses,—as for common sleighs, and wagons, where the change is so frequently required that no other would be used,—and for traveling wagons in new parts of the country, &c.

I am aware that shifting tops for carriages have been used when the calash top has been attached to the seat; or, if attached to the body of the carriage, then by removing the slat irons from their supports, and the joint bars from their lower top props:—and that the rockaway top has been attached by standard, or supports, screwed into sockets secured to the box, as described in J. C. Kimball's patent dated, Sept. 13, 1859. I, therefore, do not claim either of these as my invention:—but—

What I claim as my invention, and desire to secure by Letters Patent, is—

The shifting side, or curtain, rail in combination with the jointed bows, when the whole is constructed, connected, and made to serve the purposes designed, substantially, as herein described.

HOMER H. DIKEMAN.

Witnesses:
JOHN LUNTZ,
R. FITZGERALD.